US011021160B2

(12) United States Patent
Kotteri et al.

(10) Patent No.: US 11,021,160 B2
(45) Date of Patent: Jun. 1, 2021

(54) SLOPE DETECTION SYSTEM FOR A VEHICLE

(71) Applicant: JAGUAR LAND ROVER LIMITED, Coventry (GB)

(72) Inventors: Jithesh Kotteri, Coventry (GB); Anna Gaszczak, Coventry (GB); Neenu Isaac, Coventry (GB); Jithin Jayaraj, Coventry (GB); Bineesh Ravi, Coventry (GB); Krishna Jayaprakash, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 182 days.

(21) Appl. No.: 16/091,345

(22) PCT Filed: Mar. 16, 2017

(86) PCT No.: PCT/EP2017/056194
§ 371 (c)(1),
(2) Date: Oct. 4, 2018

(87) PCT Pub. No.: WO2017/174314
PCT Pub. Date: Oct. 12, 2017

(65) Prior Publication Data
US 2019/0135293 A1    May 9, 2019

(30) Foreign Application Priority Data
Apr. 5, 2016  (GB) ...................................... 1605775

(51) Int. Cl.
*B60W 40/076*    (2012.01)
*B60W 50/14*    (2020.01)
(Continued)

(52) U.S. Cl.
CPC ........ *B60W 40/076* (2013.01); *B60W 30/143* (2013.01); *B60W 30/18* (2013.01);
(Continued)

(58) Field of Classification Search
CPC .. B60W 40/076; B60W 30/143; B60W 30/18; B60W 50/082; B60W 2552/15; B60W 2420/52; B60W 30/10
See application file for complete search history.

(56) References Cited

U.S. PATENT DOCUMENTS 8,630,806 B1 *  1/2014  Zhu ........................ G01S 11/12
                                                                701/523
2004/0068359 A1   4/2004  Neiss et al.
(Continued)

FOREIGN PATENT DOCUMENTS

DE    102012004198 A1 * 10/2012  ............ B60K 35/00
DE    102012004198 A1   10/2012
(Continued)

OTHER PUBLICATIONS

International Search Report and Written Opinion, PCT/EP2017/056194, 18 pages, dated Jun. 6, 2017.
(Continued)

*Primary Examiner* — Jeff A Burke
*Assistant Examiner* — Jamal A Shah
(74) *Attorney, Agent, or Firm* — McCoy Russell LLP

(57) ABSTRACT

A slope detection system (10, 19, 185C) for a vehicle (100) is provided. The system has a processor (10, 19) that receives, from one or more sensors (185C) arranged to capture data in respect of terrain ahead of the vehicle, terrain information indicative of the topography of an area extending ahead of the vehicle (100). The processor (10, 19), in dependence upon a predicted path of the vehicle (100) over the terrain extending ahead of the vehicle (100), generates, (Continued)

for the predicted path of the vehicle (100), information indicative of an angle of slope of the predicted path, being the slope of the predicted path along a direction of travel of the vehicle (100).

19 Claims, 7 Drawing Sheets

(51) Int. Cl.
  *B60W 30/18* (2012.01)
  *B60W 50/08* (2020.01)
  *B60W 30/14* (2006.01)

(52) U.S. Cl.
  CPC .......... *B60W 50/082* (2013.01); *B60W 50/14* (2013.01); *B60W 2050/146* (2013.01); *B60W 2420/42* (2013.01); *B60W 2420/52* (2013.01); *B60W 2420/54* (2013.01); *B60W 2420/905* (2013.01); *B60W 2540/18* (2013.01); *B60W 2552/15* (2020.02)

(56) References Cited

U.S. PATENT DOCUMENTS

| | | | | |
|---|---|---|---|---|
| 2005/0015201 A1* | 1/2005 | Fields | ............... | G08G 1/163 |
| | | | | 701/301 |
| 2013/0297106 A1 | 11/2013 | Yamazaki et al. | | |
| 2017/0003685 A1* | 1/2017 | Pollock | ............... | G01C 21/30 |

FOREIGN PATENT DOCUMENTS

| | | |
|---|---|---|
| DE | 102012021420 A1 | 4/2014 |
| EP | 2527691 A1 | 11/2012 |
| GB | 2471276 A | 12/2010 |
| JP | H09210682 A | 8/1997 |
| JP | 2003065740 A | 3/2003 |
| JP | 2013089136 A | 5/2013 |

OTHER PUBLICATIONS

Search and Examination Report, GB1605775.4, 8 pages, dated Sep. 23, 2016.

* cited by examiner

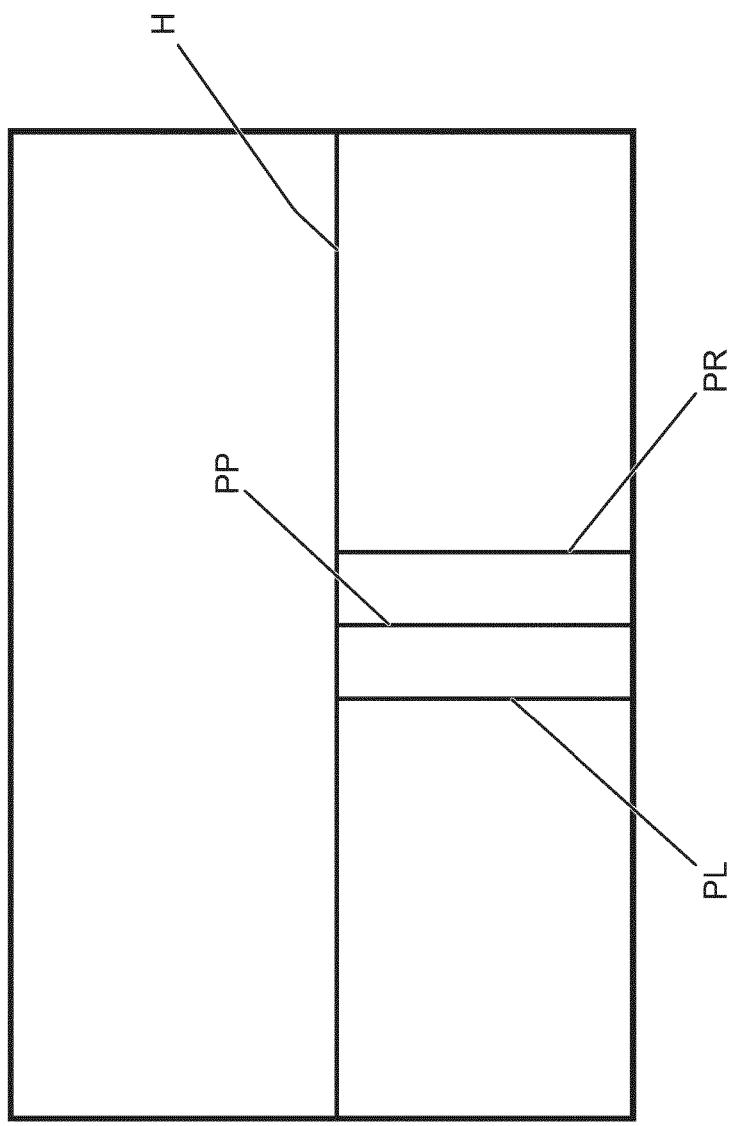

S101 Receive stream of video data from stereoscopic camera system 185C.

S103 Calculate 3D point cloud dataset based on stream of video data.

S105 Transform point cloud dataset to vehicle reference frame X, Y, Z.

S107 Generate elevation map with respect to vehicle frame of reference.

S109 Divide elevation map into cells and group datapoints in each cell into one or more patches.

S111 Identify patches corresponding to objects overhanging the predicted path and ignore for subsequent calculations.

S113 Identify shadow cells and ignore for subsequent calculations.

S115 Calculate predicted path PP and tracks PL, PR of respective left and right front wheels.

S117 Identify cells through which the left and right front wheels 111, 112 will pass a given distance along the predicted path PP up to distance D and calculate the slope angle relative to earth axes Xe, Ye, Ze at locations along the predicted path PP.

S119 Determine the maximum slope angle along the predicted path based on the calculations at step S117.

S121 Output the value of maximum slope angle calculated at step S119 to the LSP control system 12 via signal 12S and optionally to the user via instrument cluster 195.

Figure 6

SLOPE DETECTION SYSTEM FOR A VEHICLE

CROSS-REFERENCE TO RELATED APPLICATIONS

This application is a 371 of International Application No. PCT/EP2017/056194, filed Mar. 16, 2017, which claims priority to GB Patent Application 1605775.4, filed Apr. 5, 2016, the contents of both of which are incorporated by reference herein in their entirety.

INCORPORATION BY REFERENCE

The content of co-pending UK patent applications GB2507622 and GB2499461 are hereby incorporated by reference. The content of U.S. Pat. No. 7,349,776 and co-pending international patent applications WO2013124321 and WO2014/139875 are incorporated herein by reference. The content of UK patent applications GB2492748, GB2492655 and GB2499279 and UK patent GB2508464 are also incorporated herein by reference.

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

BACKGROUND

In known vehicle speed control systems, typically referred to as cruise control systems, the vehicle speed is maintained on-road once set by the user without further intervention by the user so as to improve the driving experience for the user by reducing workload. Cruise control speed (or cruise set-speed) is settable by the vehicle driver, typically by pressing a button when the vehicle is at the desired speed. Plus and minus buttons provide for incremental speed variation whilst the cruise control is set.

Once the user has selected a speed at which the vehicle is to be maintained, the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or a clutch pedal is depressed, the cruise control system is disabled so that the user can override the cruise control system to change the vehicle speed without resistance from the system. When the cruise control system is active, if the user depresses the accelerator pedal a sufficient amount the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

Some vehicles are adapted for off-highway use, and low-speed cruise control systems for such vehicles have been developed. In off-highway conditions low-speed cruise control systems permit a driver, particularly a novice driver, to concentrate upon activities such as steering.

Low-speed cruise control systems suitable for off-road use may be configured to cause a vehicle to travel at a speed that is below the user-determined set-speed in dependence on the roughness of the terrain over which the vehicle is travelling. Nevertheless the present applicant has recognised that there are circumstances other than driving over rough terrain in which a reduced vehicle speed would be helpful to a user endeavouring to negotiate the terrain.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes.

The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

GB2492655B discloses a control system for a motor vehicle in which the most appropriate terrain mode for the prevailing terrain over which the vehicle is driving is determined automatically by the control system. The control system then causes the vehicle to operate in the terrain mode determined to be the most appropriate.

It is against this background that the present invention has been conceived. Embodiments of the invention may provide an apparatus, a method or a vehicle which addresses the above problems. Other aims and advantages of the invention will become apparent from the following description, claims and drawings.

SUMMARY OF THE INVENTION

In one aspect of the invention for which protection is sought there is provided a slope detection system for a vehicle, the system comprising a processing means arranged to receive, from terrain data capture means arranged to capture data in respect of terrain ahead of the vehicle by means of one or more sensors, terrain information indicative of the topography of an area extending ahead of the vehicle, wherein the processing means is configured to, in dependence upon a predicted path of the vehicle over said terrain extending ahead of the vehicle, generate, for the predicted path of the vehicle, information indicative of an angle of slope of the predicted path, being the slope of the predicted path along a direction of travel of the vehicle.

The terrain information may comprise stereoscopic images of terrain ahead of the vehicle, for example in the form of a stream of video images from respective left and right video cameras. The terrain data capture means may be configured to pass the images to the terrain data processing means that may in turn be configured to generate 3D point cloud data from the stream of images.

Optionally, the processing means is configured to predict a path of respective left and right wheels of the vehicle over said terrain and to calculate the information indicative of said angle of slope of the predicted path in dependence on the topography of the terrain in the path of the left and right wheels.

Optionally, the processing means is configured to receive a signal indicative of steering angle, and wherein the processing means is configured to determine the predicted path in dependence at least in part on the signal indicative of steering angle.

Optionally, the slope detection system is configured to generate the information indicative of absolute slope of the predicted path relative to a reference frame that is substantially fixed with respect to earth by reference to data in respect of vehicle orientation relative to the reference frame.

It is to be understood that the data in respect of vehicle orientation relative to the reference frame may be provided by an inertial measurement unit (IMU) or any other suitable means.

Optionally, said terrain information indicative of the topography of an area extending ahead of the vehicle comprises a 3D point cloud.

Optionally, the processing means is configured to generate, from said terrain information indicative of the topography of an area extending ahead of the vehicle, a 3D point cloud comprising 3D point cloud datapoints.

Optionally, the processing means is configured to generate, from said point cloud, an elevation map of said terrain extending ahead of the vehicle.

Optionally, the slope detection system is configured to divide the elevation map into cells according to the MLS (multi-level surface) map methodology and to determine the cells through which respective left and right wheels of the vehicle will pass as the vehicle follows the predicted path. Thus, an MLS map may be generated.

The processing means may determine the cells through which respective left and right wheels of the vehicle will pass by overlaying the predicted path on the MLS map.

Optionally, the slope detection system is configured to generate the information indicative of the angle of slope in dependence at least in part on information indicative of the elevation of data points in the respective cells through which respective left and right wheels of the vehicle will pass. That is, cells through which left and right wheel tracks will pass.

Optionally, the slope detection system is configured to identify, in said point cloud, objects overhanging terrain ahead of the vehicle and to ignore such objects in generating the information indicative of the angle of side-slope.

Alternatively, the slope detection system may be configured to identify, in said MLS map, objects overhanging terrain ahead of the vehicle and to ignore such objects in generating the information indicative of the angle of side-slope.

Optionally, for each cell, the processing means calculates a mean height value of terrain datapoints of the 3D point cloud excluding datapoints corresponding to objects such as branches of trees overhanging the predicted path. The processing means may define a 3D grid of mean height datapoints, one mean height datapoint per cell, each mean height datapoint being of a height substantially equal to the mean height value of terrain datapoints of that cell. The mean height datapoints may be nominally located at the centre of each cell as viewed from above along an axis corresponding to datapoint height, which may for example be an axis fixed with respect to the vehicle or with respect to earth.

Optionally, for each cell lying on one of the predicted left and right wheel tracks, the processing means fits a line to the mean height datapoints of a group of one or more adjacent cells including the subject cell and calculates a value of relative gradient, being an angle, in a vertical plane with respect to axes fixed with respect to the vehicle, between the fitted line and a forward direction parallel to the longitudinal axis of the vehicle. The forward direction may be the forward direction of the vehicle at the instant the data used to generate the point cloud was captured, or the predicted forward direction of the vehicle if the vehicle were traversing the subject cell along the predicted path as discussed below. It is to be understood that the relative gradient may alternatively be calculated as an angle between a normal to the fitted line and normal to a forward direction along the longitudinal axis of the vehicle.

Optionally, the datapoints in one or more adjacent cells in a line in front of and in a line behind the target cell may be taken with respect to the instant forward (straight ahead) direction of the vehicle (along the vehicle longitudinal axis) when the point cloud data was captured, and a best fit line applied to these datapoints. Thus the cells may selected to be those that are in a line substantially along a direction parallel to the instant longitudinal axis of the vehicle. The angle between this best fit line (or a normal to this best fit line) and the instant forward (straight ahead) direction (for example in a vertical plane with respect to vehicle axes) at the moment the point cloud data was captured may then be calculated. This angle may be considered to be the relative gradient of the driving surface associated with this cell.

Alternatively the datapoints in one or more adjacent cells in a line in front of and in a line behind the target (subject) cell along the predicted path of the vehicle (which may be substantially parallel to the predicted direction of travel of the vehicle 100 when it travels through the subject cell) may be employed, and a best fit line applied to these datapoints. Again, the angle between this best fit line (or a normal thereto) and the instant forward direction of travel of the vehicle may be calculated. The forward direction employed may be the forward direction at the moment the point cloud data was captured or the expected forward direction when the vehicle passes through the subject cells. The calculated angle may be considered to be the relative gradient of the driving surface associated with the subject cell.

In this manner a relative gradient associated with each cell on the predicted path for each of the wheels may be determined.

Optionally, the processing means calculates a relative gradient value employing mean height datapoints of the grid of mean height datapoints of the N cells ahead of the target cell and mean height datapoints of the N' cells behind the target cell, for all cells lying on the predicted tracks of the left or right wheels, optionally up to a predetermined distance or number of cells ahead of the vehicle. N and N' may be any suitable number such as a number from 1 to 5, optionally 3. Optionally N=N'.

Optionally, the processing means may calculate a relative gradient value for each cell of the point cloud dataset, for example employing mean height datapoints in the N cells ahead of the target cell and mean height datapoints in the N' cells behind the target cell with respect to the instant z-axis of the vehicle when the point cloud data was captured.

Optionally if, in a given 3D point cloud frame of data, the difference between slope values for corresponding left and right predicted wheel tracks at any location along the predicted tracks exceeds a threshold difference value, the slope values calculated are ignored.

Optionally, the slope detection system may be configured to generate information indicative of the angle of slope at respective distances along the predicted path.

Optionally, the slope detection system is configured to generate information indicative of the angle of slope at respective distances along the predicted path and to determine a maximum value of side-slope along the predicted path.

Optionally, the slope detection system is configured to determine a maximum value of slope over a predetermined distance along the predicted path.

Optionally, the slope detection system is configured to output a signal indicative of the angle of slope along the predicted path.

Optionally, the slope detection system is configured to output a signal indicative of the maximum value of slope over a predetermined distance along the predicted path.

Optionally, the slope detection system is configured to output information indicative of the absolute angle of slope of the predicted path taking into account vehicle orientation relative to a substantially horizontal plane. Thus the relative gradient may be translated to an absolute angle of slope. Optionally, the slope detection is configured to receive information indicative of vehicle orientation from an inertial measurement unit (IMU). The data from the IMU can then be used to translate the relative gradient to an absolute slope.

Optionally, the slope detection system further comprises the terrain data capture means.

Optionally, the terrain data capture means comprises one of: a stereoscopic camera system, a radar-based terrain ranging system, a laser-based terrain ranging system, a structured light camera, or a monocular camera with structure from motion.

It is to be understood that other terrain data capture means may be useful in some embodiments, such as an acoustic ranging system.

The terrain data capture means may be configured to generate 3D point cloud information for use in determining the angle of side-slope of the predicted path. Alternatively, the terrain data capture means may generate terrain data and provide the data to the terrain data input means, the system being configured to generate 3D point cloud information from the terrain data received by the terrain data input means.

Optionally, the slope detection system is configured to provide an output to a driver indicative of the angle of slope of the predicted path of the vehicle.

Optionally, the slope detection system is configured to provide an alert to a driver in dependence on the information indicative of the angle of slope of the predicted path.

Optionally, the processing means comprises an electronic processor having an electrical input for receiving the terrain information indicative of the topography of the area extending ahead of the vehicle; and an electronic memory device electrically coupled to the electronic processor and having instructions stored therein,
  wherein the processor is configured to access the memory device and execute the instructions stored therein such that it is operable to:
  determine the predicted path of the vehicle over terrain ahead of the vehicle, and to generate, for the predicted path of the vehicle, information indicative of the angle of slope of the predicted path.

In a further aspect of the invention for which protection is sought there is provided a vehicle speed control system comprising a slope detection system according to a preceding aspect, the speed control system being configured to control vehicle speed in dependence at least in part on the information indicative of the angle of slope of the predicted path generated by the slope detection system.

Optionally, the speed control system is configured to control vehicle speed in dependence at least in part on the maximum value of slope along the predicted path.

Optionally, the speed control system is configured to control vehicle speed by limiting vehicle speed to a predetermined maximum set-speed value in dependence at least in part on the information indicative of the angle of slope of the predicted path.

Optionally, the predetermined maximum set-speed value is determined at least in part in dependence on the information indicative of the angle of slope of the predicted path.

Optionally, the vehicle speed control system is configured to control vehicle speed in further dependence at least in part on the identity of a selected one of a plurality of driving modes in which the vehicle is operating.

Optionally, the predetermined maximum set-speed value is determined at least in part in dependence on the identity of the selected one of the plurality of driving modes in which the vehicle is operating.

Optionally, in each driving mode at least one of a plurality of vehicle subsystems is caused to operate in a predetermined one of a plurality of configuration modes of that subsystem, the subsystem configuration mode being determined in dependence on the selected driving mode.

Optionally, the subsystems include at least one of a powertrain subsystem, a brakes subsystem and a suspension subsystem.

In a further aspect of the invention for which protection is sought there is provided a vehicle comprising a slope detection system, or a vehicle speed control system, according to any preceding aspect.

In a still further aspect of the invention for which protection is sought there is provided a method of detecting slope ahead of the vehicle comprising:
  receiving, from terrain data capture means arranged to capture data in respect of terrain ahead of the vehicle by means of one or more sensors, terrain information indicative of the topography of an area extending ahead of the vehicle;

in dependence upon information in respect of a predicted path of the vehicle over said terrain extending ahead of the vehicle, generating, for the predicted path of the vehicle, information indicative of the angle of slope of the predicted path, being the slope of the predicted path along a direction of travel of the vehicle.

Optionally, the method further comprises generating information in respect of a predicted path of the vehicle over said terrain extending ahead of the vehicle.

Optionally, the method comprises generating the information in respect of the predicted path in dependence at least in part on steering angle.

Optionally, generating information indicative of the angle of slope of the predicted path comprises generating information indicative of a maximum angle of slope along the predicted path.

Optionally, generating information indicative of the angle of slope of the predicted path comprises generating information indicative of a maximum angle of slope along the predicted path over a predetermined distance ahead of the vehicle.

The method may further comprise controlling vehicle speed in dependence at least in part on the information indicative of the angle of slope of the predicted path.

In an aspect of the invention for which protection is sought there is provided a non-volatile carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a non-transitory computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

The present invention will now be described, by way of example only, with reference to the accompanying drawings, in which:

FIG. 6 is a flow chart illustrating operation of a vehicle according to the embodiment of FIG. 1.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
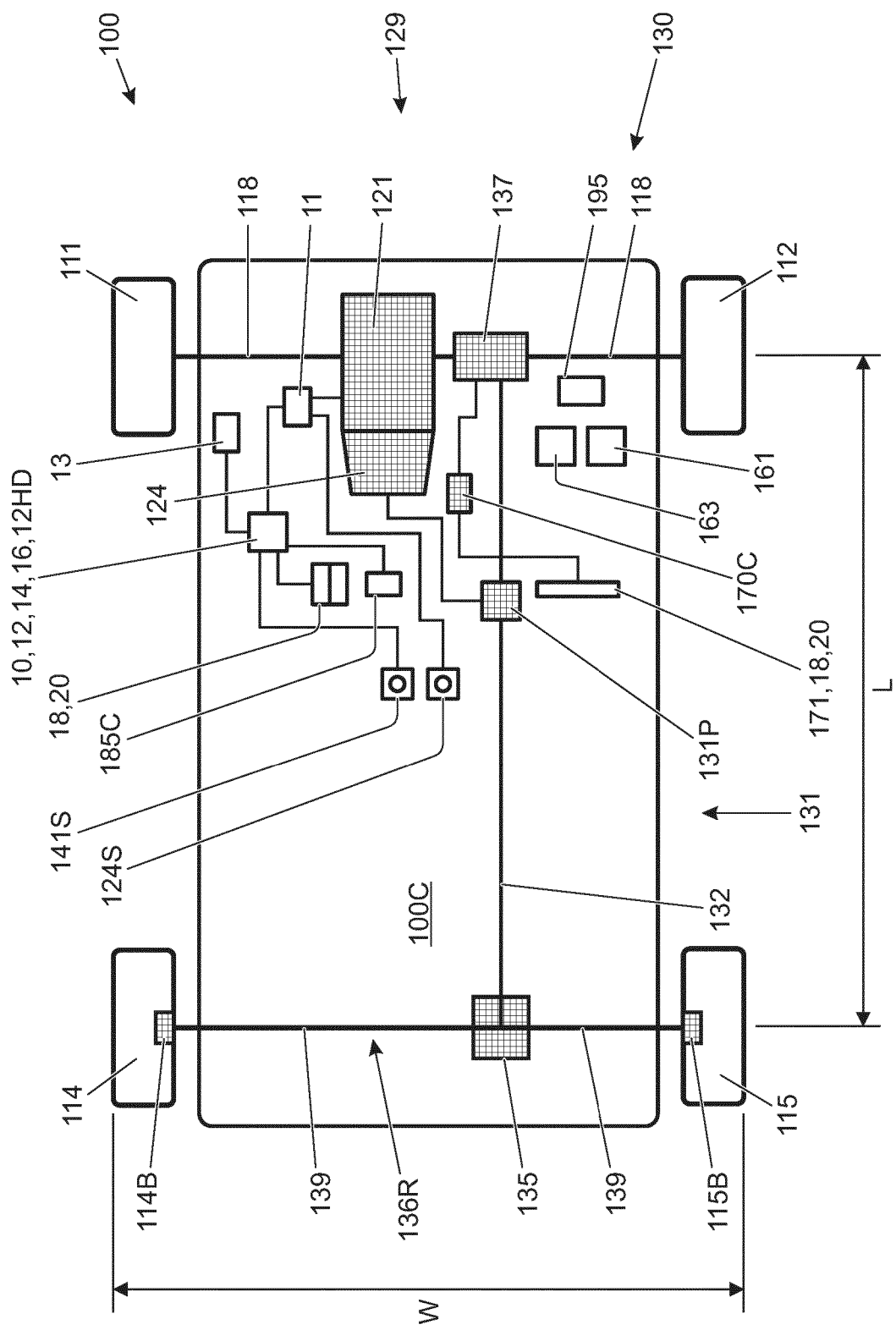
FIG. 1 is a schematic illustration of a vehicle according to an embodiment of the invention in plan view.
Figure 2:
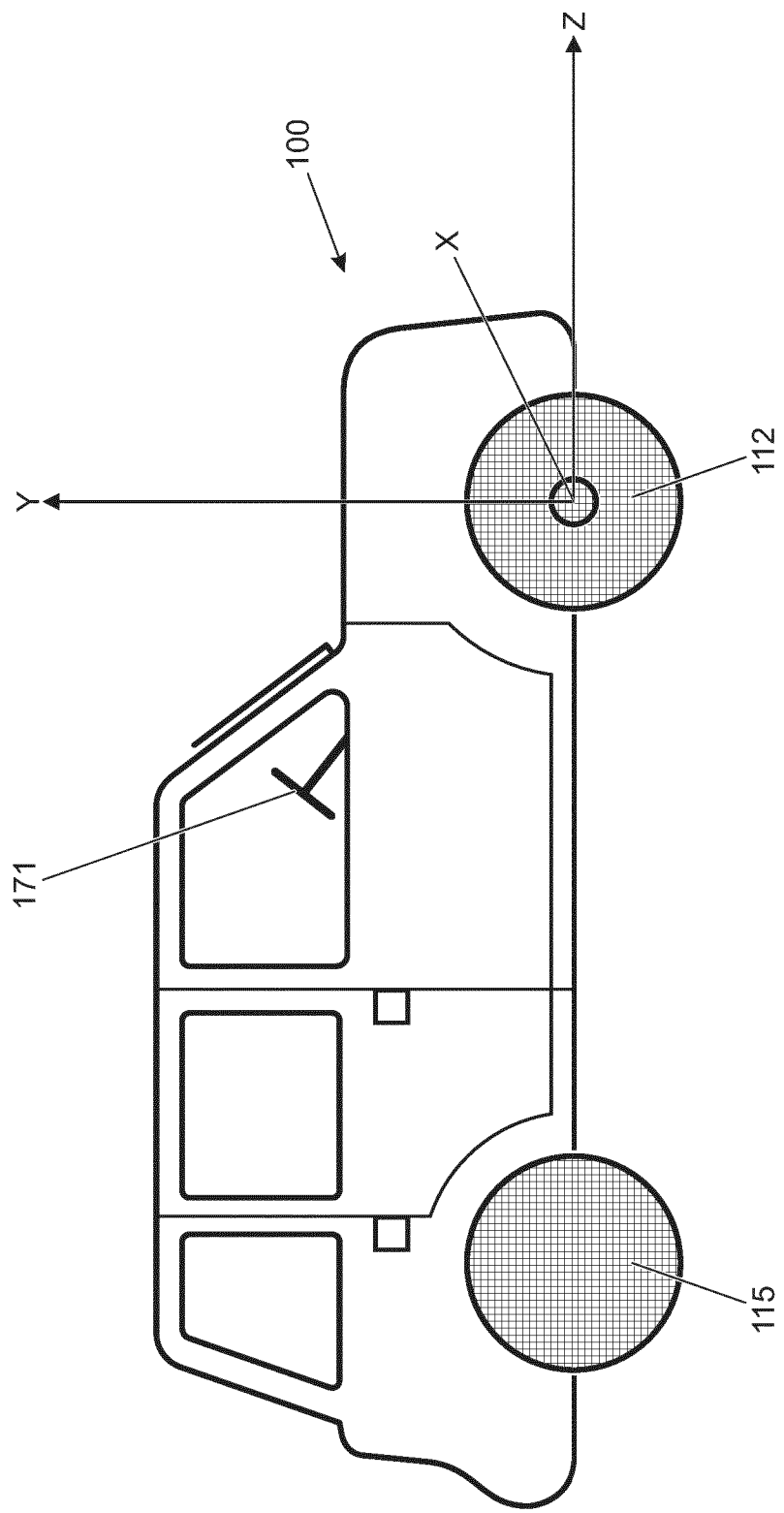
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
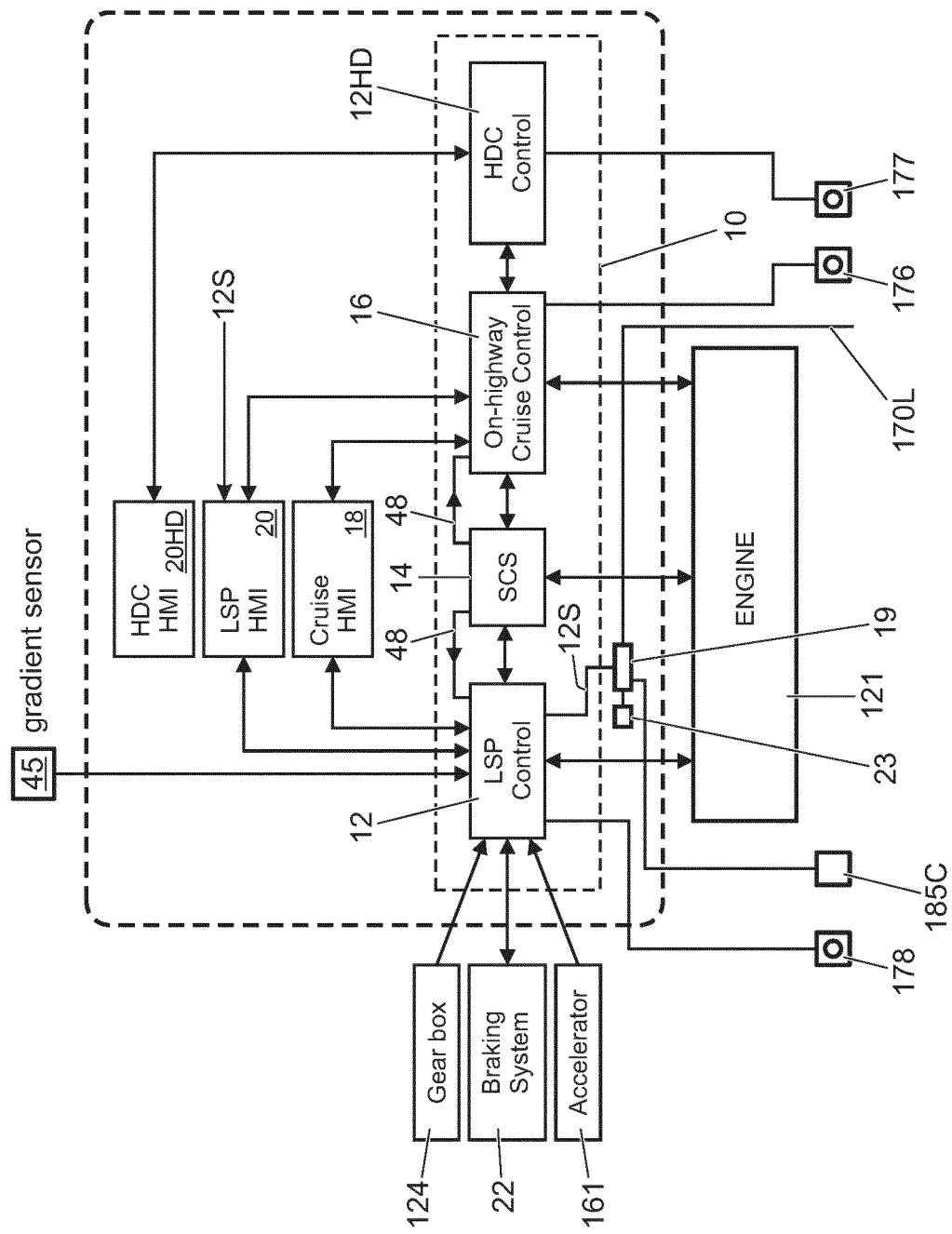
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 (an anti-lock braking system (ABS) controller) and a steering controller 170C. The ABS controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 is operable automatically to command the ABS controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the ABS controller 13.

Although not shown in detail in FIG. 3, the VCU 10 further includes a Traction Control (TC) function block. The TC function block is implemented in software code run by a computing device of the VCU 10. The ABS controller 13 and TC function block provide outputs indicative of, for example, TC activity, ABS activity, brake interventions on individual wheels and engine torque requests from the VCU 10 to the engine 121 in the event a wheel slip event occurs. Each of the aforementioned events indicate that a wheel slip event has occurred. In some embodiments the ABS controller 13 implements the TC function block. Other vehicle sub-systems such as a roll stability control system or the like may also be included.

Figure 4:
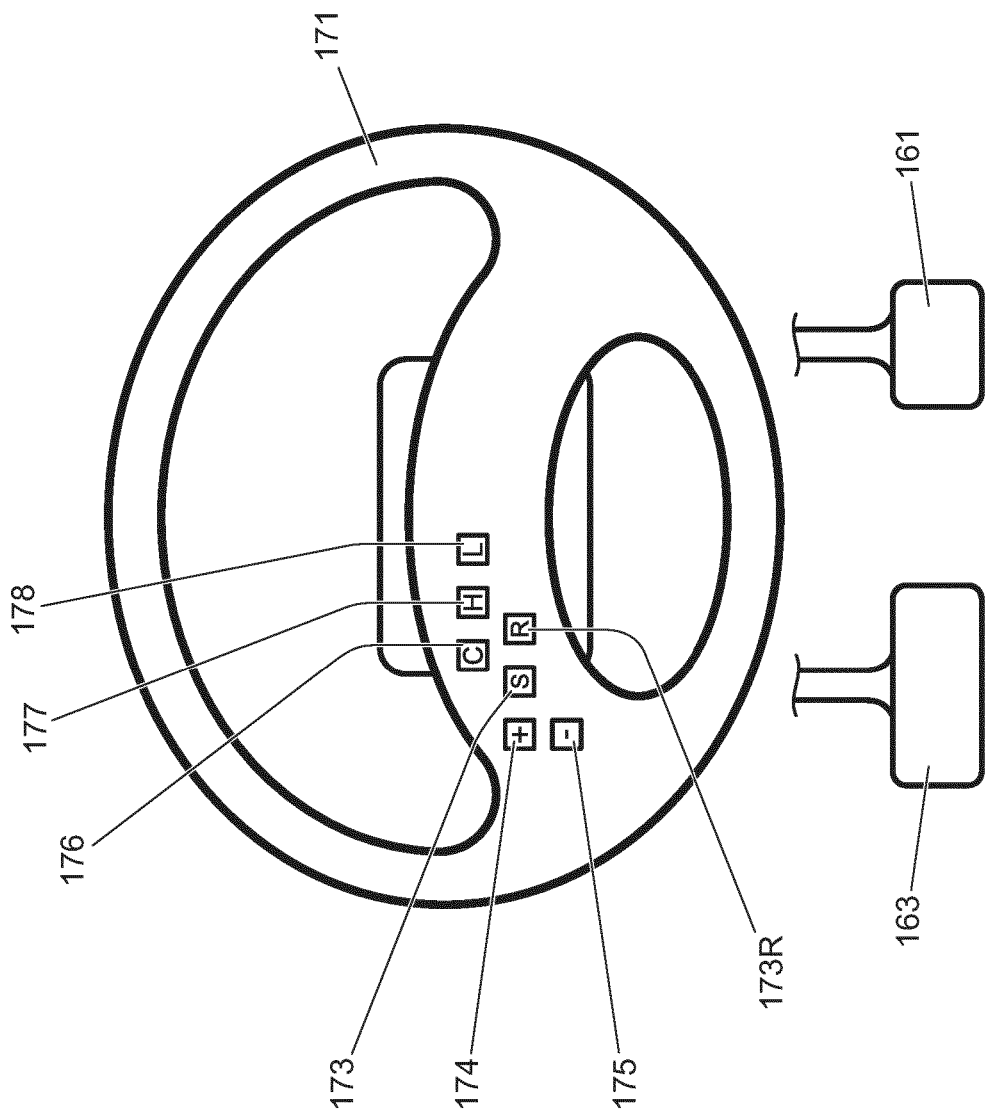
FIG. 4 illustrates a steering wheel of a vehicle according to the embodiment of FIG. 1.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, control of vehicle speed by the cruise control system 16 is cancelled and the vehicle 100 reverts to a manual mode of operation which requires accelerator or brake pedal input by a user in order to maintain vehicle speed. In addition, detection of a wheel slip event, as may be initiated by a loss of traction, also has the effect of cancelling control of vehicle speed by the cruise control system 16. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user to maintain vehicle speed. Low-speed speed control (or progress control) functionality is not provided by the on-highway cruise control system 16 which operates only at speeds above 25 kph.

In the present embodiment, the LSP control system 12 is activated by pressing LSP control system selector button 178 mounted on steering wheel 171. The system 12 is operable to apply selective powertrain, traction control and braking actions to one or more wheels of the vehicle 100, collectively or individually.

The LSP control system 12 is configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system 12 (which is the range from 2 to 30 kph in the present embodiment although other ranges are also useful) and no other constraint on vehicle speed exists whilst under the control of the LSP control system 12, the LSP control system 12 controls vehicle speed in accordance with a LSP control system set-speed value LSP_set-speed which is set substantially equal to user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, the desired value of user_set-speed as noted above by means of the 'set-speed' button 173 and the '+'/'−' buttons 174, 175 in a similar manner to the cruise control system 16. The LSP HMI 20 also includes a visual display by means of which information and guidance can be provided to the user about the status of the LSP control system 12.

The LSP control system 12 receives an input from the ABS controller 13 of the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161, and an input from the transmission or gearbox 124. This latter input may include signals representative of, for example, the speed of an output shaft of the gearbox 124, an amount of torque converter slip and a gear ratio request. Other inputs to the LSP control system 12 include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 is a gyroscopic sensor. In some alternative embodiments the LSP control system 12 receives a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. Methods for the calculation of vehicle reference speed based for example on vehicle wheel speeds are well known. For example in some known vehicles the vehicle reference speed may be determined to be the speed of the second slowest turning wheel, or the average speed of all the wheels. Other ways of calculating vehicle reference speed may be useful in some embodiments, including by means of a camera device or radar sensor.

The HDC system 12HD is activated by depressing button 177 comprised by HDC system HMI 20HD and mounted on the steering wheel 171. When the HDC system 12HD is active, the system 12HD controls the braking system 22 in order to limit vehicle speed to a value corresponding to that of a HDC set-speed parameter HDC_set-speed which may be controlled by a user in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph. The HDC set-speed parameter may also be referred to as an HDC target speed. Provided the user does not override the HDC system 12HD by depressing the accelerator pedal 161 when the HDC system 12HD is active, the HDC system 12HD controls the braking system 22 (FIG. 3) to prevent vehicle speed from exceeding HDC_set-speed. In the present embodiment the HDC system 12HD is not operable to apply positive drive torque. Rather, the HDC system 12HD is only operable to cause negative brake torque to be applied, via the braking system 22.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response (TR) modes, or control modes.

In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. Other driving modes may be provided in addition or instead. In the present embodiment the selector 141S also allows a user to select an 'automatic driving mode selection condition' of operation in which the VCU 10 selects automatically the most appropriate driving mode as described in more detail below. The on-highway driving mode may be referred to as a 'special programs off' (SPO) mode in some embodiments since it corresponds to a standard or default driving mode, and is not required to take account of special factors such as relatively low surface coefficient of friction, or surfaces of high roughness.

In order to prevent or at least reduce passenger discomfort due to rapid changes in acceleration rate (jerk) when the LSP control system 12 is controlling vehicle speed, the LSP control system 12 limits the rate of change of acceleration of the vehicle 100 such that it does not exceed a prescribed maximum value. The maximum allowable rate of change of acceleration or maximum allowable jerk value is provided by parameter LSP_J_MAX. The LSP control system 12 also limits the maximum value of rate of acceleration to a value LSP_A_MAX.

The values of LSP_A_MAX and LSP_J_MAX are set in dependence at least in part on TR mode and vehicle speed. In some embodiments, including the present embodiment, the values for TR_mode=sand are higher than the corresponding values for TR_mode=SPO, GGS or MR due to the higher drag imposed on a vehicle 100 traversing sand compared with a vehicle traversing a dry asphalt highway surface, a grass, gravel or snow surface, or a muddy or rutted surface.

The LSP control system 12 causes the vehicle 100 to operate in accordance with the value of LSP_set-speed.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In some embodiments torque is applied to the vehicle wheels individually, for example by powertrain torque vectoring, so as to maintain the vehicle at the required speed. Alternatively, in some embodiments, torque may be applied to the wheels collectively to maintain the required speed, for example in vehicles having drivelines where torque vectoring is not possible. In some embodiments, the powertrain controller 11 may be operable to implement torque vectoring to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements may also be useful.

Where a powertrain 129 includes one or more electric machines, for example one or more propulsion motors and/or generators, the powertrain controller 11 may be operable to modulate torque applied to one or more wheels in order to implement torque vectoring by means of one or more electric machines.

In some embodiments the LSP control system 12 may receive a signal wheel_slip (also labelled 48 in FIG. 3) indicative of a wheel slip event having occurred. This signal 48 is also supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation on receipt of wheel_slip signal 48. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels (by the powertrain 129 and braking system 22) so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 16 resumed by pressing the resume button 173R or set-speed button 173.

The vehicle 100 is also provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling.

The sensors (not shown) on the vehicle 100 include, but are not limited to, sensors which provide continuous sensor outputs to the VCU 10, including wheel speed sensors, as mentioned previously, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit) 170C. The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C. The ePAS unit 170C also provides a signal indicative of steering wheel rotational position or angle.

In the present embodiment, the VCU 10 evaluates the various sensor inputs to determine the probability that each of the plurality of different TR modes (control modes or driving modes) for the vehicle subsystems is appropriate, with each control mode corresponding to a particular terrain type over which the vehicle is travelling (for example, mud and ruts, sand, grass/gravel/snow) as described above.

If the user has selected operation of the vehicle in the automatic driving mode selection condition, the VCU 10 then selects the most appropriate one of the control modes and is configured automatically to control the subsystems according to the selected mode. This aspect of the invention is described in further detail in our co-pending patent applications GB2492748, GB2492655 and GB2499279, the contents of each of which is incorporated herein by reference as noted above.

As indicated above, the nature of the terrain over which the vehicle is travelling (as determined by reference to the selected control mode) may also be utilised in the LSP control system 12 to determine an appropriate increase or decrease in vehicle speed. For example, if the user selects a value of user_set-speed that is not suitable for the nature of the terrain over which the vehicle is travelling, the system 12 is operable to automatically adjust the value of LSP_set-speed to a value lower than user_set-speed. In some cases, for example, the user selected speed may not be achievable or appropriate over certain terrain types, particularly in the case of uneven or rough surfaces. If the system 12 selects a set-speed (a value of LSP_set-speed) that differs from the user-selected set-speed user_set-speed, a visual indication of the speed constraint is provided to the user via the LSP HMI 20 to indicate that an alternative speed has been adopted. Other arrangements may be useful.

In the present embodiment, the VCU 10 is configured to calculate a value of forward slope of the driving surface over a predicted path ahead of the vehicle 100 based at least in part on 3D terrain information captured by the vehicle 100. The forward slope value is displayed to a driver of the vehicle 100 to assist the driver in traversing the terrain.

In the present embodiment, the vehicle 100 is provided with a stereoscopic camera system 185C configured to generate stereo colour image pairs by means of a pair of forward-facing colour video cameras comprised by the system 185C. A stream of dual video image data is fed from the cameras to a processing unit 19 (or processing portion 19) that processes the image data received and repeatedly generates a 3D point cloud data set based on the images received. Techniques for generating 3D point cloud data sets based on stereoscopic image data are well known. Each point in the 3D point cloud data set corresponds to a 3D coordinate of a point on a surface of terrain ahead of the vehicle 100 viewed by each of the forward-facing video cameras of the stereoscopic camera system 185C.

It is to be understood that, in some embodiments, non-colour, grey-scale (black and white) cameras may be employed instead of colour cameras. Furthermore, in some further embodiments a different camera arrangement such as structured light cameras or a monocular camera with SFM (structure from motion) may be employed instead of a stereoscopic camera system. In some alternative embodiments a sensor system other than a camera system may be employed, such as a LIDAR (Light Detection And Ranging) system.

In the present embodiment the 3D point cloud dataset is transformed such that the origin of the frame of reference of the dataset is the midpoint of a line joining the points at which the two front wheels 111, 112 of the vehicle 100 touch the ground over which the vehicle 100 is driving (also referred to herein as contact points or patches). In the present embodiment the frame of reference is defined with respect to Cartesian coordinates X, Y, Z where X is an axis transverse to the direction of vehicle travel, i.e. along a lateral direction with respect to the vehicle 100, Y is an axis oriented in an upward direction with respect to the vehicle 100, corresponding to a substantially vertically upward direction when the vehicle 100 is parked on level ground, and Z is parallel to or coincident with a longitudinal axis of the vehicle 100, along the direction of travel of the vehicle 100.

The processing unit 19 also receives data indicative of steering angle from the ePAS unit 170C via signal line 170L and takes this data into account in determining the predicted path.

Figure 5B:
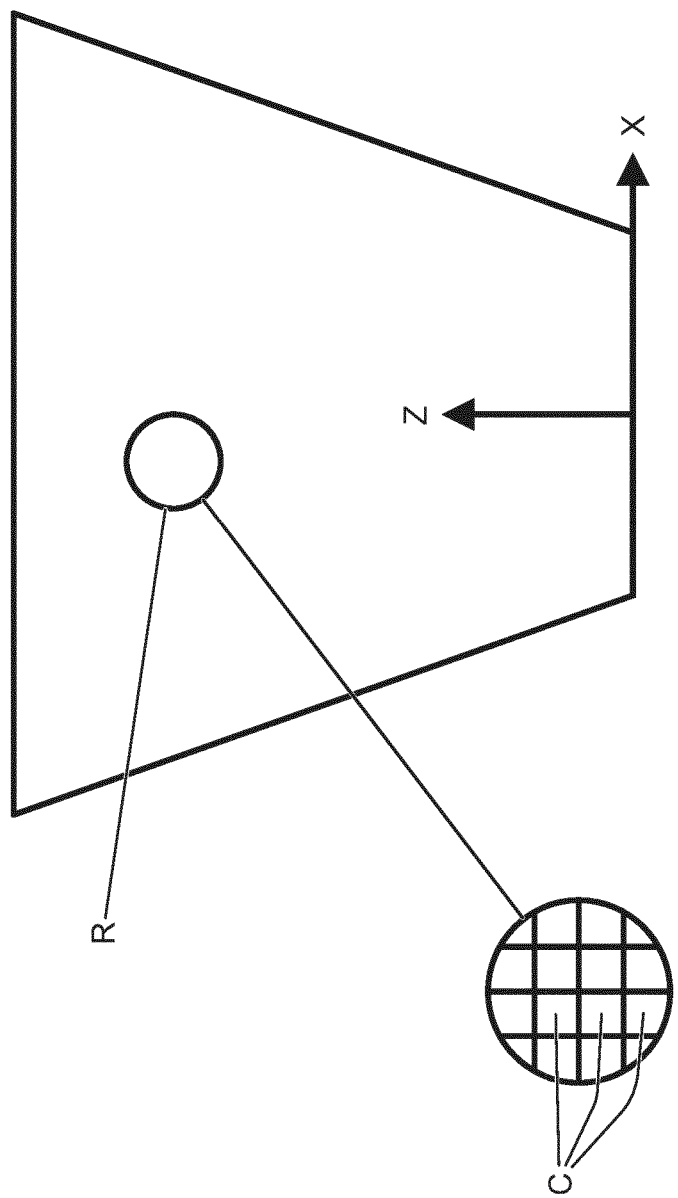
FIG. 5 is a schematic illustration of (a) a view of terrain ahead of the vehicle as captured by a stereoscopic camera system showing predicted left and right wheel tracks, and (b) a plan view of an elevation map of the terrain generated from stereoscopic image data.

FIG. 5(*a*) is a schematic representation of an image of terrain ahead of the vehicle 100 as captured by one of the two cameras of the camera system 185C. Superimposed on the image is a centreline of a predicted path PP of the vehicle 100 over the terrain as determined by the processing unit 19. The predicted tracks of respective left and right wheels over the terrain are labelled PL and PR. In the example shown, steering wheel 171 of the vehicle 100 is centred, i.e. in the 'straight ahead' position, and the processing unit 19 has determined that the predicted path PP is in a straight line directly ahead of the vehicle 100.

The processing unit 19 is configured to compute a terrain elevation map populated by data points of the point cloud dataset. FIG. 5(*b*) is a schematic illustration in plan view of an elevation map of terrain ahead of the vehicle 100. In the present embodiment the elevation map is generated with respect to the vehicle axes X, Y, Z (i.e. in the vehicle frame of reference). Following the MLS (multi-level surface) map methodology, the elevation map is notionally considered to be composed of square cells C in the X-Z plane of predetermined size as illustrated schematically in FIG. 5(*b*) (see inset). In the present embodiment the cells are of side 0.25 m although other sizes may be useful in some embodiments.

In the present embodiment, each 3D point of the elevation map is assigned to a cell C according to its position with respect to the X-Z plane. A given cell may contain points that are at multiple levels or heights, i.e. having different values of Y coordinate. The points within a given cell are grouped into one or more respective 'patches' according to the value of the Y coordinate, points having a Y coordinate within a given predetermined range of values of the Y coordinate being assigned to a patch corresponding to that range of values of Y coordinate. Thus, for example, points within a given patch are substantially coplanar, the plane defined by those points being substantially parallel to the X-Z plane. In contrast, points within the same cell that correspond to a bridge passing over the driving surface would not form part of the same patch as points falling on the driving surface. It is to be understood that each point in a given patch contains information regarding the geometry of the points falling within that patch.

It is to be understood that data structures other than MLS maps may be employed, for example Voxel maps may also be used, the purpose of the map being to reduce the number of data points.

The processing unit 19 analyses the cells and a cell is labelled as an 'obstacle' cell if the variance and range of the datapoints in the lowest patch of the cell exceed respective predetermined threshold values. In some alternative embodiments, mean height may be employed instead. In some embodiments, height difference (mean height) between a current cell and neighbouring cells may be used to detect obstacles, i.e. relatively large steps in height between neighbouring cells may indicate the presence of an obstacle. Cells not labelled as obstacle cells may be labelled as a 'horizontal patch'. If a cell does not contain any points it may be labelled an 'empty patch'.

In addition to implementing the MLS methodology as described above, the elevation map is refined such that overhanging patches falsely labelled as horizontal patches are discarded. An overhanging patch is a patch that is at a different height to a corresponding lower patch of the same cell consistent with the presence of an object that overhangs the surface over which the vehicle 100 is driving such as a branch of a tree or bridge that the vehicle 100 is passing underneath.

Cells labelled as obstacle cells are not employed in the calculation of slope. Furthermore, cells that are behind obstacles and which would be occluded from camera view Obstacle shadows' or 'shadow cells') are identified and also disregarded. This is because they may interfere with correct slope calculation.

Slope value is calculated from the predicted path by using only those cells with confidence value greater than a specified threshold. Cells which are marked as obstacles and empty are not considered for the slope calculation.

The processing unit 19 then determines the cells ahead of the vehicle 100 through which front tyres of the vehicle 100 are predicted to pass, i.e. cells through which the predicted tracks PL, PR of the left and right front wheels 111, 112 will likely pass including cells labelled as obstacle cells. The processing unit 19 employs a known value of track length T of the vehicle 100 (i.e. the distance between the centres of wheels of a given axle, which is lower than the vehicle overall width, W of the vehicle 100) in order to determine the predicted tracks PL, PR.

The processing unit 19 calculates a mean height value of terrain datapoints in each grid cell C excluding datapoints in overhanging patches falsely labelled as horizontal patches as noted above. The processing unit 19 defines a 3D grid of mean height datapoints, each mean height datapoint being located at the centre of each cell C as viewed along the Y axis, and of a height substantially equal to the mean height value of terrain datapoints of that cell C as described above.

The processing unit 19 then calculates the gradient over which the vehicle will travel. This may be effected in one of a number of ways.

In a first example embodiment the processing unit first determines the path that the vehicle will travel and then calculates the gradient of each individual cell lying on one of the predicted wheel tracks. For each cell lying on one of the predicted wheel tracks PL, PR, the processing unit 19 fits a line to the mean height datapoints of a group of one or more adjacent cells including the subject cell and calculates a value of a 'raw slope angle', being an angle between a normal to the fitted line and the forward direction of travel of the vehicle 100 (Z-direction), along the vehicle 100, at the moment the point cloud data was captured. In particular, starting from the cell (the target or subject cell) for which the processing unit 19 is calculating the slope, the datapoints in one or more adjacent cells in front of and behind the target cell, are employed to calculate slope. This may be done in one of two ways.

The datapoints in one or more adjacent cells in front of and behind the target cell may be taken with respect to the instant z-axis of the vehicle 100 when the point cloud data was captured (which may not be parallel to the direction of travel of the vehicle 100 when it travels through the subject cell), and a best fit line applied to these datapoints. The angle between a normal to this best fit line and the instant forward direction of travel at the moment the point cloud data was captured is calculated. This angle may be considered to be the gradient of the driving surface associated with this cell.

Alternatively the datapoints in one or more adjacent cells in front of and behind the target cell on the predicted path of the vehicle (which will be substantially parallel to the direction of travel of the vehicle 100 when it travels through the subject cell) may be employed, and a best fit line applied to these datapoints. The angle between a normal to this best fit line and the instant forward direction of travel at the moment the point cloud data was captured is calculated. This angle may be considered to be the gradient of the driving surface associated with this cell. In this manner a gradient associated with each cell on the predicted path for each of the wheels is determined.

In the present embodiment the processing unit 19 calculates a gradient value employing mean height datapoints of the grid of mean height datapoints of the three cells ahead of the target cell and mean height datapoints of the three cells behind the target cell, with respect to the instant z-axis of the vehicle 100 when the point cloud data was captured, although it will be appreciated that other numbers of adjacent cells may be used.

In some alternative example embodiment, the processing unit 19 calculates a relative gradient value for each cell C of the point cloud dataset, for example employing mean height datapoints in the three cells ahead of the target cell and mean height datapoints in the three cells behind the target cell as described above, with respect to the instant z-axis of the vehicle 100 when the point cloud data was captured. The processing unit 19 then extracts gradient values in respect of cells along the predicted tracks PL, PR, for example by overlaying the predicted tracks PL, PR on the grid cells to determine over which grid cells the predicted tracks will pass, in order to determine gradient of terrain over which the vehicle 100 is predicted to pass.

The processing unit 19 converts the relative gradient for each cell C along the predicted tracks PL, PR to an absolute slope angle (being slope angle relative to an earth reference frame) taking into account the orientation of the vehicle 100 at a given moment in time. It is to be understood that the processing unit 19 obtains information indicative of vehicle orientation with respect to an earth reference frame Xe, Ye, Ze (where Xe is a horizontal axis through the midpoint of a notional line joining the contact patches of the front wheels 111, 112 of the vehicle 100, and is a projection of the vehicle X-axis onto a horizontal plane through the midpoint of the notional line, Ye is a vertical axis through the midpoint of the notional line and Ze is a horizontal axis through the midpoint, orthogonal to the Xe and Ye axes) from an inertial measuring (or measurement) unit (IMU) 23 that generates a signal indicative of vehicle orientation with respect to the Xe, Ye, Ze axes. A value of absolute slope angle is calculated for each cell C. The cells C through which front wheels 111, 112 of the vehicle 100 are predicted to pass, based on the predicted tracks PL, PR, are then determined.

Associated with the absolute slope value calculated for each cell C is a confidence level of the value. The processing unit 19 determines the maximum value of absolute slope of all cells C along the predicted path that have a confidence level greater than a threshold value. Optionally, the processing unit 19 may determine the maximum value of absolute slope to be substantially equal to the minimum value of slope exhibited by the group of N successive cells C through which the front left or right wheels 111, 112 will pass, along the predicted path, for which the minimum value of slope is higher than that of any other group of N successive cells through which the front left or right wheels 111, 112 will pass. Thus, in the case that N=3, the processing unit may determine the minimum value of slope exhibited by the group of three successive cells through which the front left or right wheels 111, 112 will pass, having the highest value of minimum slope.

A confidence value for each cell is found by taking the mean of the density of points in all the four neighbouring cells sharing an edge with the subject cell. It takes into consideration only the non-empty cells for confidence calculation.

It is to be understood that by cell density is meant the number of valid/available measurements (3D points) in each cell. If the number of measurements (3D points) is below a threshold value, the cell is considered to be empty/invalid. In the present embodiment the threshold value is 10, but other values may be useful in some embodiments. Provided the number of measurements exceeds the threshold value the cell is represented as corresponding to a region of terrain having a mean height value that is the mean of all the 3D points within the cell.

In the present embodiment, the confidence value is calculated by taking the mean of the point density of the non-empty cells neighbouring the subject cell. Thus, if the point densities of the neighbouring cells are 40, 50, 60 and 50 points/cell respectively, the mean density based on neighbouring cells is (40+50+60+50)/4=50.

A confidence value for each of the left and right tyre predicted paths PL, PR is found by taking the minimum confidence value of the three successive cells over which the predicted path has the maximum slope. The confidence value for the predicted path is taken as the confidence value of the path (left or right) with maximum slope value.

If, in a given frame of data, the difference between slope values for corresponding left and right predicted tracks PL, PR at any location along the predicted tracks PL, PR exceeds a threshold difference value, the slope values calculated are determined to be spurious and are ignored. In this case, the processing unit 19 employs the slope values obtained from the most recently acquired frame for which the difference between slope values of respective tracks PL, PR did not exceed the threshold difference value, i.e. for which the slope values were not considered to be spurious, in calculating the slope of the predicted path. Furthermore, the processing unit 19 compares the maximum value of absolute slope determined for the current given frame with the corresponding maximum values obtained for the three previous frames for which the slope values were not considered to be spurious. If the maximum value of absolute slope determined for the current given frame is not consistent with those of these previous three frames, the processing unit 19 ignores the slope values for present frame and employs the maximum value of absolute slope determined for the previous frame for which the slope values were not spurious as the prevailing predicted maximum value of absolute slope.

The processing unit 19 then provides one or more output signals indicative of the value of maximum absolute slope ahead of the vehicle along the predicted path, the confidence value of this maximum absolute slope value, and the value of absolute slope calculated for each cell C in the dataset.

In the present embodiment, the processor 19 outputs a value of the maximum calculated absolute slope angle to the LSP control system 12 via signal 12S. In addition the VCU 10 displays maximum calculated value of absolute slope angle to a driver via instrument cluster 195.

In some embodiments, the processing unit 19 transforms the point cloud dataset from the vehicle reference frame X, Y, Z to the earth reference frame Xe, Ye, Ze in order to correct for vehicle orientation before applying the MLS methodology and dividing the point cloud points in a given cell into patches. It is to be understood that account may be taken of vehicle orientation at another stage of the determination of slope angle in other embodiments.

As noted above, a value of absolute slope angle relative to earth axes is output to the LSP control system 12 via signal 12S as shown in FIG. 3. The LSP control system 12 employs the value of absolute slope angle to calculate a maximum allowable value of LSP_set-speed, LSP_set-speed_max, from a look-up table. The value of LSP_set-speed_max is calculated at least in part in dependence on the value of absolute slope angle and the identity of the TR mode in which the vehicle 100 is operating. In the present embodiment, the LSP control system 12 takes into account other indicators of maximum allowable value of LSP_set-speed including terrain surface roughness that are also employed by the VCU 10 to determine the most appropriate driving mode (TR mode) when operating in the automatic driving mode selection condition.

In particular, in the present embodiment the LSP control system 12 has a look up table of absolute slope angle against LSP_set_speed_max. In the present embodiment, but not all embodiments, multiple look up tables are provided, one for each driving (TR) mode. The maximum absolute slope angle over the next 15 m of terrain ahead of the vehicle 100 is calculated and the corresponding value of LSP_set_speed_max based on slope angle, LSP_set_speed_max s, is determined from the look up table. The LSP control system 12 arbitrates between different values of LSP_set_speed_max based on different factors including terrain surface roughness as noted above as well as slope angle. The LSP control system 12 takes the smallest value from amongst the various different values of LSP_set_speed_max and limits the value of LSP_set-speed accordingly.

It is to be understood that the maximum value of LSP_set-speed determined by the LSP control system 12 may be higher in certain TR modes, such as the on-highway mode, for a given value of absolute slope angle of terrain ahead of the vehicle 100. This is at least in part because the amount of traction obtainable on different surfaces varies at least in part with surface coefficient of friction between wheels of the vehicle 100 and the driving surface. For example, the likelihood of the vehicle suffering wheel slip may be higher when ascending a surface of a given absolute slope that is covered in grass, gravel or snow compared with a dry asphalt surface of similar slope. Accordingly the LSP control system 12 may set the value of LSP_set_speed_max s to a lower value for a given absolute slope when the GGS TR_mode has been selected, compared with the value when the on-highway TR_mode has been selected.

In some embodiments, the maximum value of LSP_set-speed may be higher in certain TR modes, such as the on-highway mode, for a given value of absolute slope angle of terrain compared with one or more other TR modes only if the condition is met that the value of absolute slope angle exceeds a predetermined threshold value such as a slope of 10 degrees, 15 degrees, 20 degrees or any other suitable value which may be determined empirically.

FIG. 6 illustrates the manner in which the determination of absolute slope angle is performed.

At step S101 the processing unit 19 receives a stream of image data from the stereoscopic camera system 185C.

At step S103 the processing unit 19 calculates the 3D point cloud dataset based on the most recently received stereoscopic image pair comprised by the stream of image data. In some embodiments, averaging of one or more respective left and right image frames may be performed in order to generate a 'smoothed' respective left and right image frame, reducing image noise. Other noise reduction techniques may be applied in addition or instead.

At step S105 the point cloud dataset is transformed by the processing unit 19 to the vehicle reference frame X, Y, Z from the reference frame of the camera system 185C. In the present embodiment, the camera system 185C is mounted in an upper region of a windscreen of the vehicle 100.

At step S107 the processing unit 19 generates an elevation map with respect to the vehicle frame of reference.

At step S109 the processing unit 19 divides the elevation map into cells and groups datapoints in each cell into one or more patches.

At step S111 the processing unit 19 identifies any patches of each cell that correspond to objects overhanging the predicted path and ignores these patches for subsequent calculations in respect of terrain slope. The processing unit also identifies cells having less than a threshold number of datapoints, and ignores these cells for calculations of terrain slope. In the present embodiment the threshold number of datapoints is ten as noted above although other values may be useful in some alternative embodiments.

At step S113 the processing unit 19 identifies shadow cells in the elevation map, and ignores these for subsequent calculations in respect of terrain slope.

At step S115 the processing unit 19 calculates wheel tracks PL, PR for respective left and right front wheels.

At step S117 the processing unit 19 identifies cells C through which left and right front wheels 111, 112 of the vehicle 100 will pass as the vehicle wheels travel along the predicted tracks PL, PR up to a distance D ahead of the vehicle 100. The processing unit 19 calculates the slope angle relative to earth axes Xe, Ye, Ze for each successive group of three cells C through which respective left and right wheels 111, 112 will pass.

At step S119 the processing unit 19 determines the maximum side-slope angle along the predicted path based on the calculations at step S117.

At S121 the processing unit 19 outputs the value of maximum side-slope angle calculated at step S119 to the LSP control system 19 via signal 12S. The processing unit 19 may also output the maximum side-slope angle to the user via a visual display on instrument cluster 195.

In some alternative embodiments, the LSP control system 12 is configured to set the value of LSP_set-speed_max to a value that is dependent on the current value of LSP_set-speed and the value of absolute slope angle ahead of the vehicle 100 as indicated by signal 12S. Other arrangements may be useful in some embodiments.

Some embodiments of the present invention enable vehicle operation with enhanced composure when traversing terrain. This is at least in part due to a reduction in driver workload when operating with the LSP control system 12 active. This is because a driver is not required manually to decrease the value of user_set-speed in order to reduce vehicle speed when approaching terrain representing a relatively steep slope. Rather, the vehicle 100 anticipates that the vehicle 100 will traverse terrain representing a slope and reduce vehicle speed accordingly.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A slope detection system for a vehicle, the system comprising:
   a processor arranged to:
      receive terrain information indicative of topography of terrain extending ahead of the vehicle from a terrain data capture system arranged to capture data in respect of terrain ahead of the vehicle by one or more sensors, wherein the received terrain information comprises a 3D point cloud;
      based on a predicted path of the vehicle over said terrain extending ahead of the vehicle, generate, for the predicted path of the vehicle, information indicative of an angle of a slope of the predicted path, being the slope of the predicted path along a direction of travel of the vehicle;
      predict a path of a left wheel and a right wheel of the vehicle over said terrain; and
      calculate the information indicative of said angle of said slope of the predicted path based on topography of the terrain in the path of the left wheel and the right wheel.

2. A slope detection system according to claim 1 wherein the processor is further arranged to:
   receive a signal indicative of steering angle, and
   determine the predicted path based on the signal indicative of steering angle.

3. A slope detection system according to claim 1 wherein the processor is further arranged to:
   generate the information indicative of absolute slope of the predicted path relative to a reference frame that is substantially fixed with respect to earth by reference to data in respect of vehicle orientation relative to the reference frame.

4. A slope detection system according to claim 3, wherein the processor is further arranged to:
   output information indicative of the absolute slope of the predicted path taking into account vehicle orientation relative to a substantially horizontal plane.

5. A slope detection system according to claim 1 wherein the processor is further arranged to:
   generate information indicative of the angle of slope at each of a plurality of distances along the predicted path; and
   determine a maximum value of slope along the predicted path.

6. A slope detection system according to claim 1 comprising the terrain data capture system.

7. A system according to claim 1 wherein the terrain data capture system comprises at least one selected from a group consisting of the following:
   a stereoscopic camera system,
   a radar-based terrain ranging system,
   a laser-based terrain ranging system,
   a structured light camera, and
   a monocular camera with structure from motion.

8. A slope detection system according to claim 1 configured to provide an output to a driver indicative of the angle of slope of the predicted path of the vehicle.

9. A slope detection system according to claim 1, wherein the processor comprises:
   an electronic processor comprising:
      an electrical input for receiving the terrain information indicative of the topography of the area extending ahead of the vehicle; and
      an electronic memory device electrically coupled to the electronic processor and having instructions stored therein,
   wherein the electronic processor is configured to:
      access the electronic memory device and execute the instructions stored therein such that it is operable to:
         determine a predicted path of the vehicle over terrain ahead of the vehicle; and
         generate, for the predicted path of the vehicle, information indicative of the angle of the slope of the predicted path.

10. A vehicle speed control system comprising a slope detection system according to claim 1, the speed control system being configured to:
    control vehicle speed based on the information indicative of the angle of the slope of the predicted path generated by the slope detection system.

11. A vehicle speed control system according to claim 10, the speed control system being configured to:
    control vehicle speed based on the maximum value of the slope along the predicted path.

12. A vehicle speed control system according to claim 10 wherein the speed control system is configured to:
    control vehicle speed by limiting vehicle speed to a predetermined maximum set-speed value based on the information indicative of the angle of the slope of the predicted path.

13. A vehicle comprising a slope detection system according to claim 1.

14. A slope detection system according to claim 1 wherein the processor is further arranged to:
    identify, in the 3D point cloud, objects overhanging terrain ahead of the vehicle; and
    ignore such objects in generating the information indicative of the angle of the slope.

15. A slope detection system for a vehicle, the system comprising:
    a processor arranged to:
       receive terrain information indicative of topography of terrain extending ahead of the vehicle from a terrain data capture system arranged to capture data in respect of terrain ahead of the vehicle by one or more sensors, wherein the received terrain information comprises a 3D point cloud;
       based on a predicted path of the vehicle over said terrain extending ahead of the vehicle, generate, for the predicted path of the vehicle, information indicative of an angle of a slope of the predicted path, being the slope of the predicted path along a direction of travel of the vehicle;
       generate an elevation map of said terrain extending ahead of the vehicle based on the 3D point cloud;
       divide the elevation map into cells according to a multi-level surface map methodology to generate a multi-level surface, MLS, map; and
       determine the cells through which a left wheel and a right wheel of the vehicle will pass as the vehicle follows the predicted path.

16. A slope detection system according to claim 15 wherein the processor is further arranged to:

generate the information indicative of the angle of the slope in dependence at least in part on information indicative of elevation of data points in respective cells through which a left wheel and a right wheel of the vehicle will pass.

17. A slope detection system according to claim 15 wherein the processor is further arranged to:
identify, in the MLS map, objects overhanging terrain ahead of the vehicle; and
ignore such objects in generating the information indicative of the angle of the slope.

18. A slope detection system, comprising:
a vehicle having at least a left wheel and a right wheel;
one or more sensors;
a terrain data capture system arranged to capture data in respect of terrain ahead of the vehicle by the one or more sensors, wherein the received terrain information comprises a 3D point cloud; and
a processor arranged to:
receive terrain information indicative of topography of the terrain ahead of the vehicle from the terrain data capture system;
based on a predicted path of the vehicle over said terrain ahead of the vehicle, generate, for the predicted path of the vehicle, information indicative of an angle of a slope of the predicted path, being the slope of the predicted path along a direction of travel of the vehicle;
predict a path of the left wheel and the right wheel of the vehicle over said terrain; and
calculate the information indicative of said angle of said slope of the predicted path based on topography of the terrain in the path of the left wheel and the right wheel.

19. A slope detection system, comprising:
a vehicle having at least a left wheel and a right wheel;
one or more sensors;
a terrain data capture system arranged to capture data in respect of terrain ahead of the vehicle by the one or more sensors, wherein the received terrain information comprises a 3D point cloud; and
a processor arranged to:
receive terrain information indicative of topography of the terrain ahead of the vehicle from the terrain data capture system;
based on a predicted path of the vehicle over said terrain ahead of the vehicle, generate, for the predicted path of the vehicle, information indicative of an angle of a slope of the predicted path, being the slope of the predicted path along a direction of travel of the vehicle;
generate an elevation map of said terrain extending ahead of the vehicle based on the 3D point cloud;
divide the elevation map into cells according to a multi-level surface map methodology to generate a multi-level surface, MLS, map; and
determine the cells through which a left wheel and a right wheel of the vehicle will pass as the vehicle follows the predicted path.

* * * * *